(No Model.)

J. B. ATWATER.
WEIGHING MACHINE.

No. 264,432. Patented Sept. 19, 1882.

Witnesses:
Robt. L. Fenwick
Alex. Scott

Inventor:
John B. Atwater
by his Atty
Fenwick & Lawrence

N. PETERS. Photo-Lithographer, Washington, D. C.

United States Patent Office.

JOHN B. ATWATER, OF CHICAGO, ILLINOIS.

WEIGHING-MACHINE.

SPECIFICATION forming part of Letters Patent No. 264,432, dated September 19, 1882.

Application filed June 10, 1882. (No model.)

*To all whom it may concern:*

Be it known that I, JOHN B. ATWATER, a citizen of the United States, residing at Chicago, in the county of Cook and State of Illinois, have invented a new and Improved Machine for Weighing Substances, of which the following is a specification, in connection with the annexed drawings and letters of reference marked thereon, in which—

Figure 1:
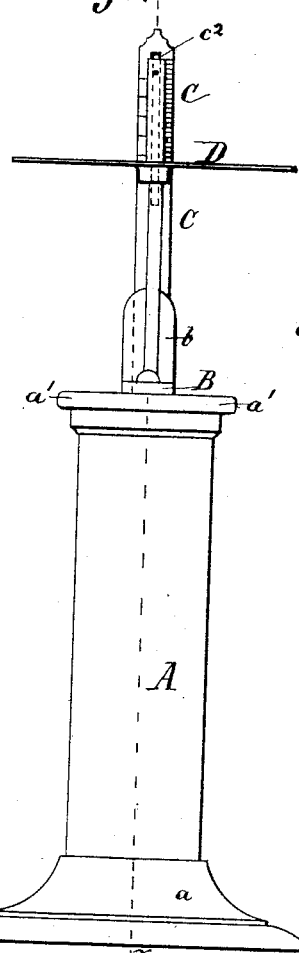
Figure 2:
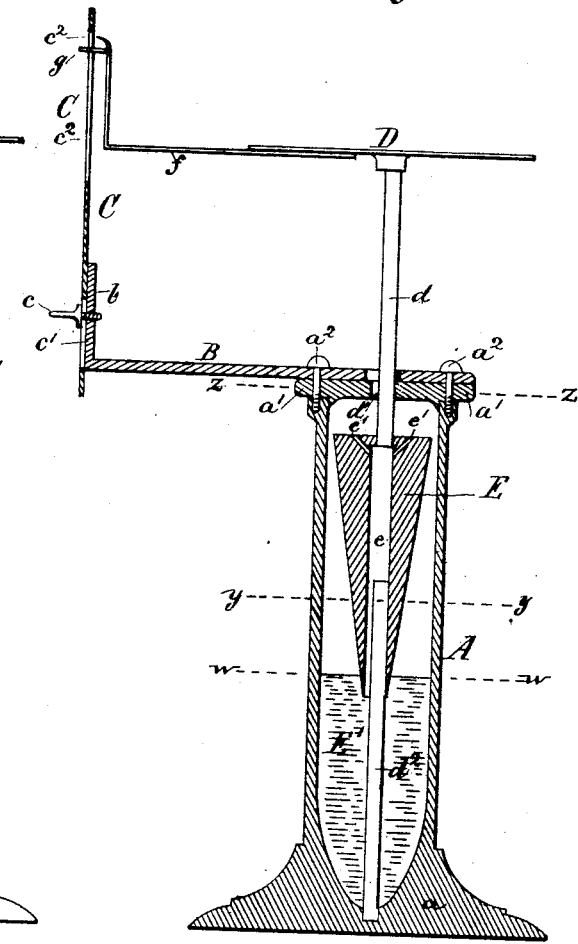
Figure 3:
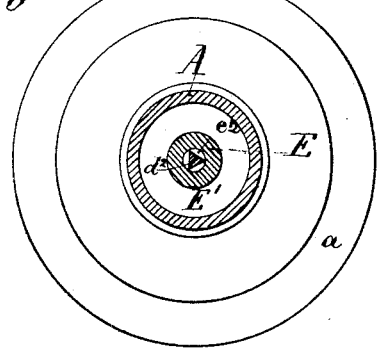
Figure 4:
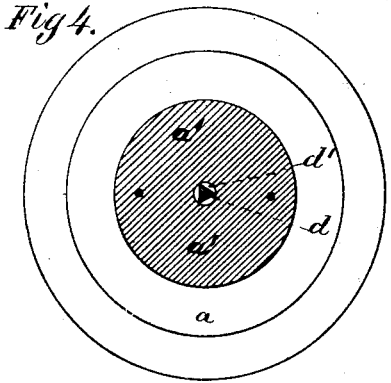

Figure 1 is an elevation of my improved machine for weighing substances, the same in this instance being adapted more particularly for use in the post-offices of the United States Government for the purpose of determining the amount of postage to be paid on letters and packages for transportation in the United States mails, as well as for private use for the same purpose. Fig. 2 is a central vertical section in the line $x\,x$ of Fig. 1. Fig. 3 is a horizontal section in the line $y\,y$ of Fig. 2, and Fig. 4 is a horizontal section in the line $z\,z$ of Fig. 2.

The object of my invention is the construction of a weighing-machine in connection with which quicksilver may be successfully employed in determining the weight of articles, the use of which fluid enables me to construct a weighing-machine in small compass, and not liable to become upset from casual causes, and in which machine an upright hollow stand or column may be employed to contain the quicksilver as well as support the connected operating mechanism, and in which column a hollow plunger is operated, and in connection therewith means employed for compensating for any extraordinary change of density of the quicksilver due to change of temperature.

In the drawings, A indicates a cylindrical hollow column, mounted upon a pedestal, $a$, and provided at its top with a disk-cap, $a'$, seated upon the top of the column and held in place by screw-bolts $a^2$, which pass through a plate, as at B, which supports the scaled plate of the machine, the disk-cap $a'$ and plate B being both held fixedly in position upon the column by said screw-bolts $a^2$. The plate B, as shown, is made with a turned-up portion, $b$, to which a scaled plate, C, is adjustably applied by an adjusting-screw, $c$, which passes through a longitudinal slot, $c'$, in the lower portion of the scaled plate, as shown, while the upper portion of the scaled plate C is made with a longitudinal slot, $c^2$, for a purpose which will be presently described.

D is a circular or disk-formed "table-tray" upon which articles to be weighed are placed. This tray is mounted fixedly upon the upper end of a tray-rod, $d$, which in cross-section is in triangular form, as clearly shown in Fig. 4, and which passes through a circular opening, $d'$, in the disk-cap $a'$, as indicated in Figs. 2 and 4, and is attached at its lower end to a tapering hollow plunger, E, within a quicksilver-chamber, E', of the column A. This prismatically-formed tray-rod $d$ is made so as to have its three longitudinal edges or acute-angle edges just slightly impinge against an interior portion or wall of the circular aperture $d'$ in the cap-disk $a'$, so that when the plunger E is depressed within the quicksilver contained in the chamber E' in the act of weighing, said rod $d$ will only impinge upon the wall of the aperture $d'$ at three points of contact, and thus only be subject to slight friction, while at the same time the said three acute-angle edges will serve to center the plunger E in its descent and assist in preventing the "binding" of the rod $d$ in the aperture $d'$ during the act of weighing. The plunger E, which may be made of ivory, glass, or any suitable material which will not be affected injuriously by contact with the quicksilver, or become coated therewith, is made with a central longitudinal circular chamber, $e$, which communicates with the upper portion of the chamber E through air-vents $e'$, as shown in Fig. 2, and extending upwardly into this chamber $e$ is a guide and centering rod, $d^2$, which is triangularly formed, the same as the tray-rod $d$, and for the same purpose—to wit, to center and guide the plunger E in its movements up and down in the act of weighing—the acute-angular longitudinal portions of this rod $d^2$ being the only portions of the rod which impinge against the wall of the chamber $e$ during such act. The rod $d^2$, as shown, is at its bottom fixed centrally to the pedestal $a$, and in exact vertical line with the rod $d$, and thus, when the plunger E in the act of weighing is made to move in contact with the quicksilver within the chamber E', the metallic fluid will be forced up into the chamber $e$ on three sides of the rod $d^2$ through passages $e^2$, and thus serve to steady and center on a vertical line the plunger E during its movements up and down. The height of the metallic fluid or quicksilver I have, for example, indicated by the line $ww$, and the plunger E, being made of tapering or of cone form, as shown, and with its small end entering the fluid, allows of a more or less delicate or slight depression of the plunger into the quicksilver, and so allows the pointer $f$, attached to the tray D, to indicate upon the scaled plate C the weight of the article placed upon the tray. As previously stated, the scaled plate is provided at its upper end with a longitudinal slot, as at $c^2$, and in this slot a steady-pin, $g$, of the pointer $f$ is made to travel in the act of weighing, and thus contribute to the steadiness of action of the machine when in use; and if there should be any expansion or contraction of the quicksilver, due to temperature, sufficient to materially affect the weighing capability of the machine, the scaled plate C may be adjusted up or down accordingly by the adjusting-screw $c$.

It will be seen that the three-cornered guide-rod $d^2$ enables me to guide the float E by actual contact with the rod $d^2$ without interfering with the displacement of the quicksilver immediately at the bottom of the float. If the rod were round or square, the quicksilver could not be displaced so readily at the bottom of the float, for the reason that there would be no place for it to immediately flow into, and, besides this, there would be much greater friction than when the rod is made with three knife-edge corners which alone impinge upon the float.

What I claim as my invention, and desire to secure by Letters Patent, is—

1. The chamber A for containing quicksilver, provided with guide-rod $d^2$, of prismatic form, and with a scaled plate, C, in connection with the hollow float E, having a tray-stem and tray, and a pointer applied to it, substantially as and for the purpose described.

2. A weighing-scale comprising the tray-stem, of prismatic form, the hollow float, the guide-stem $d^2$, having longitudinal corners, and the chamber A for containing quicksilver, substantially as described.

3. The adjustable scaled plate C, in connection with the pointer $f$, tray D, tray-rod $d$, float E, guide $d^2$, and chamber A for containing mercury, substantially as described.

JOHN B. ATWATER.

Witnesses:
H. V. COLEMAN,
CHARLES A. ROGERS.